United States Patent [19]
Cook

[11] Patent Number: 4,750,604
[45] Date of Patent: Jun. 14, 1988

[54] MECHANICAL HANDLING APPARATUS

[75] Inventor: Kenneth Cook, Gwynedd, Wales

[73] Assignee: Hydraroll Limited, Gwynedd, United Kingdom

[21] Appl. No.: 923,593

[22] Filed: Oct. 27, 1986

[30] Foreign Application Priority Data

Oct. 25, 1985 [GB] United Kingdom ............... 8526422

[51] Int. Cl.⁴ ............................................. B65G 37/00
[52] U.S. Cl. .................................. 198/468.6; 198/774; 254/10 C; 254/127
[58] Field of Search ............... 198/774, 468.6, 468.8, 198/636, 750; 414/750, 392, 525 B, 281, 282, 495, 522; 254/10 R, 10 B, 10 C, 124, 127

[56] References Cited

U.S. PATENT DOCUMENTS

| | | | |
|---|---|---|---|
| 2,511,073 | 6/1950 | McCandless | 254/10 C |
| 2,899,043 | 8/1959 | Young | 198/774 X |
| 3,059,904 | 10/1962 | Kimball | 254/10 C |
| 3,313,429 | 4/1967 | Cole | 414/392 |
| 3,648,827 | 3/1972 | Gipperrch et al. | 198/774 |
| 4,245,657 | 1/1981 | Jordan et al. | 254/10 C X |
| 4,582,464 | 4/1986 | Bossetti | 414/392 X |

FOREIGN PATENT DOCUMENTS

| | | | |
|---|---|---|---|
| 488669 | 7/1938 | United Kingdom | 414/525 B |
| 737174 | 9/1955 | United Kingdom | 414/525 B |
| 831541 | 3/1960 | United Kingdom | 254/10 C |

Primary Examiner—Robert J. Spar
Assistant Examiner—Cheryl L. Gastineau
Attorney, Agent, or Firm—Shapiro and Shapiro

[57] ABSTRACT

Mechanical handling apparatus includes a surface and a driving mechanism for moving a load over the surface which comprises a substantially vertically reciprocable platform device for actuating the load, and a lever device including at least two oppositely pivoted levers for raising and lowering the platform device. Preferably, the apparatus comprises a platform for carrying loads, a mechanism for raising and lowering the platform, the mechanism including at least two levers each pivoted relative to the platform and each pivoted relative to a respective one of a pair of actuating members, the actuating members being movable towards and away from each other, whereby relative movement of the actuating members in one direction pivots the levers to raise the platform and relative movement of the actuating members in the opposite direction pivots the levers to lower the platform.

7 Claims, 2 Drawing Sheets

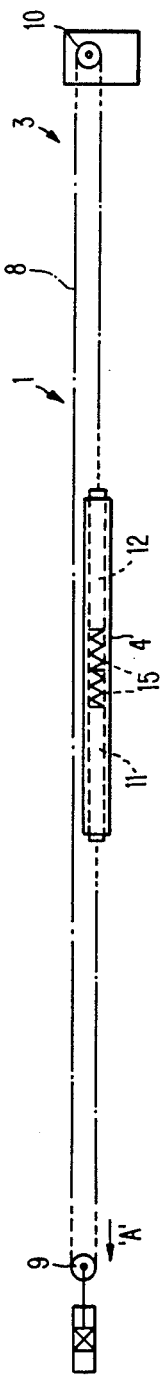
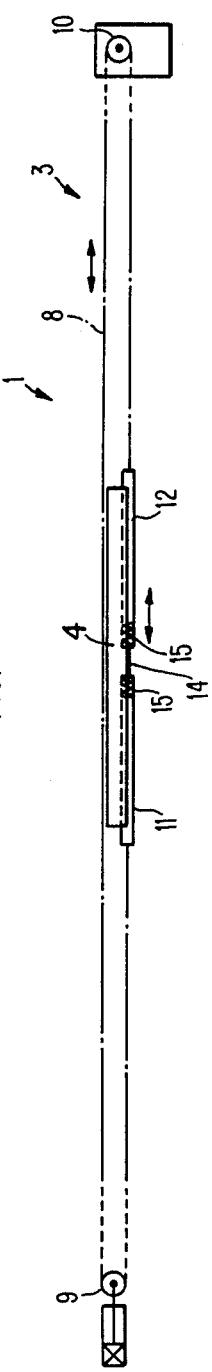
FIG. 3
FIG. 4

MECHANICAL HANDLING APPARATUS

The invention relates to mechanical handling apparatus.

According to the invention there is provided mechanical handling apparatus including a surface and power means for moving a load over the surface which comprises a substantially vertically reciprocable platform device for actuating the load, and a lever device including at least two oppositely pivoted levers for raising and lowering the platform device.

According to the invention, there is also provided apparatus for mechanical handling of loads, comprising a platform for carrying loads, means for raising and lowering the platform, said means including at least two levers each pivoted relative to the platform and each pivoted relative to a respective one of a pair of actuating members, the actuating members being movable towards and away from each other, whereby relative movement of the actuating members in one direction pivots the levers to raise the platform and relative movement of the actuating members in the opposite direction pivots the levers to lower the platform.

Mechanical handling apparatus embodying the invention is hereinafter described, by way of example, with reference to the accompanying drawings.

FIGS. 3 and 4 show, on a smaller scale than FIGS. 1 and 2, respective operating schemes for those two Figs.

Figure 1:
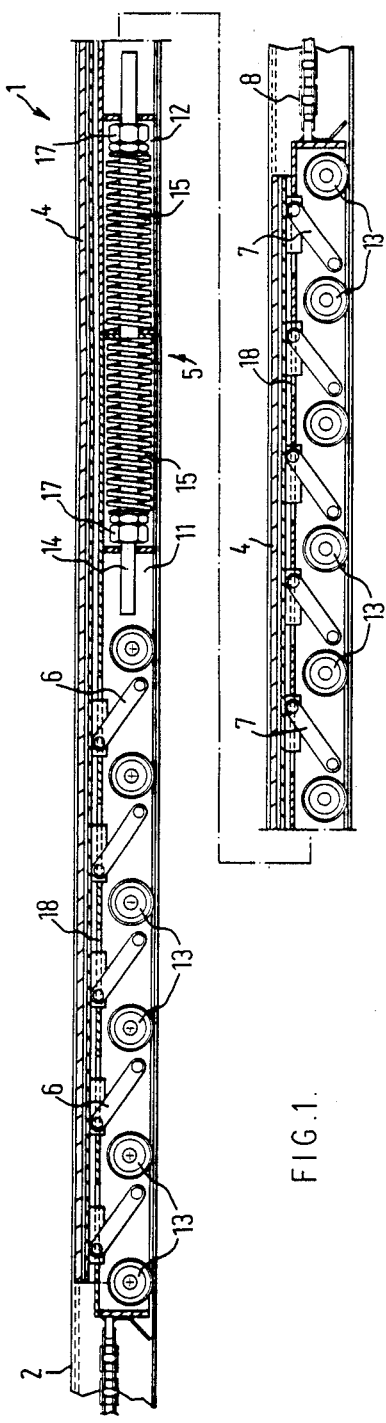
FIG. 1 is a longitudinal sectional view of part of the apparatus in one position.
Figure 2:
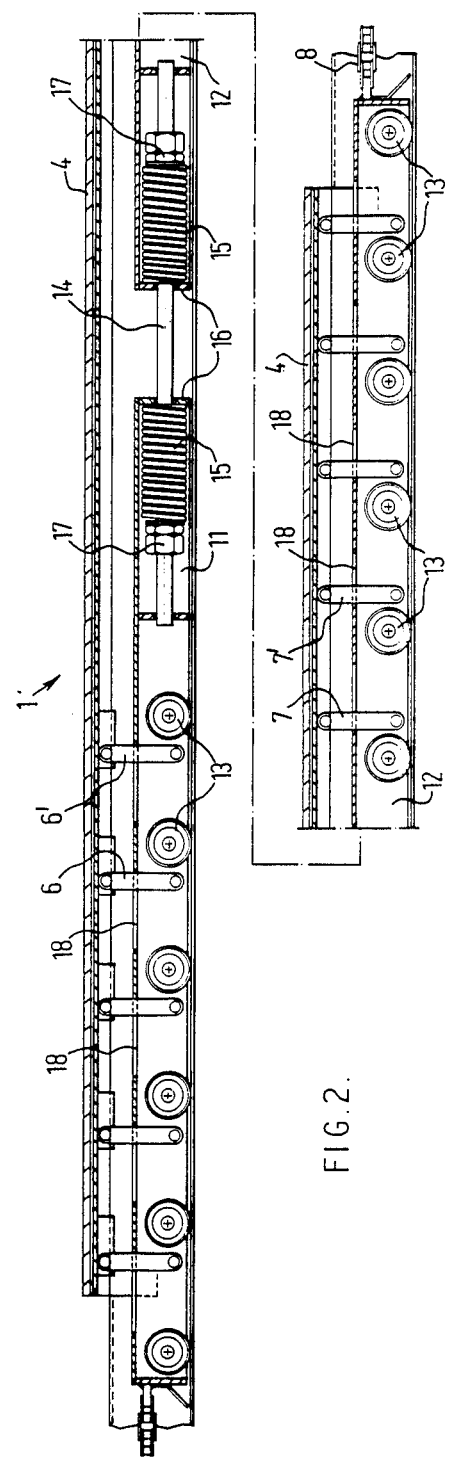
FIG. 2 is a view of the apparatus of FIG. 1 in an alternative position.

Referring to the drawings, there is shown mechanical handling apparatus 1 including a surface 2 and power means 3 for moving a load over the surface 2, which means comprises a substantially vertically reciprocable platform 4 for contacting the load, and a lever device 5 including at least two oppositely pivoted levers 6 and 7 for raising and lowering the platform.

The apparatus 1 may be installed in a container vehicle in which a load is passed along the length thereof on rotatable means such as rollers which are set in the floor of the vehicle in two substantially parallel tracks. Preferably the rollers are raised and lowered with respect to the floor of the vehicle by means such as a pneumatically inflatable air bag extending the length of each track. When this bag is inflated the rollers protrude above the floor and the track is "live". When the bag is deflated, the rollers sink below the level of the floor, and the track is dead.

The power means 3 comprises an elongate member such as a chain 8 trained round two opposite sprockets 9 and 10 mounted on horizontal axles, the ends of the chain 8 being connected to a roller cradle which comprises two inverted channels 11 and 12 each having rollers 13 protruding through their respective open bottoms to roll on a sub-floor or the like of the vehicle. The two channels 11 and 12 are connected by a rod 14 which supports in each channel resilient means such as a spring 15 held between an end wall 16 of the channel and a captive abutment such as a nut 17 on the rod 14. The top of each channel 11 and 12 has a series of slots 18 through which project parallel levers 6, 6' etc., and 7, 7' etc. The levers are pivoted at one end between opposite side walls of the respective channel and the platform 4. The levers 6, 6' of the channel 11 pivot in the opposite sense to those of the channel 12.

The sprocket 9 is movable in the direction of the arrow "A" in FIG. 3. The sprocket 10 is driven.

In use, for the platform 4 to contact a load, it is necessary for the sprocket 9 to be moved in the direction of arrow 'A' (FIG. 3) so pulling the channel 11 to the left and the channel 12 to the right, as viewed. The resulting effective lengthening of the chain 8 is accommodated by the rightward movement of the channel 12 as the sprocket 10 is fixed. The movement of both channels 11 and 12 is accompanied by the levers 6, 6', 7, 7' etc., pivoting in unison in opposite senses in the two channels, to raise the platform 4 evenly, to the load engaging position. If the power means driving sprocket 10 is now actuated, the chain 8 draws the platform 4 along the vehicle floor as desired. To disengage the platform 4 from the load, it is merely necessary to return sprocket 9 from the FIG. 4 position to the FIG. 3 position. This effectively "shortens" the chain 8 and the stored energy of the springs 15 returns the channels 11 and 12 together, as shown in FIG. 1.

What is claimed is:

1. Apparatus for mechanical handling of loads, comprising platform means for carrying loads; means for raising and lowering said platform means into and out of engagement with a load, said raising and lowering means including a pair of actuating members, at least two levers each pivoted to said platform means and to a respective one of said actuating members, and a substantially inextensible elongate member having opposite ends each connected to a respective one of said actuating members, said elongate member being passed around spaced guide members which are relatively movable from a rest position to an actuating position to increase spacing between said actuating members such that said levers pivot to raise said platform means, and from said actuating position to said rest position to reduce spacing between said actuating members such that said levers pivot to lower said platform means; and means for driving said elongate member over said guide members to effect travel of the elongate member and movement of the actuating members in a common direction such that said platform means moves in a horizontal direction.

2. Apparatus according to claim 1, wherein said drive means drives at least one of the guide members to effect said travel of the elongate member.

3. Apparatus according to claim 1, wherein the elongate member is a chain and at least one of the guide members is a sprocket.

4. Apparatus according to claim 1, including resilient means urging the actuating members towards each other.

5. Apparatus according to claim 1, wherein each actuating member is provided with rotatable means for rolling along a support surface when the actuating members are moved.

6. Apparatus according to claim 5, wherein the rotatable means are rollers.

7. Apparatus according to claim 1, comprising a respective plurality of said levers connected to each actuating member.

* * * * *